Sept. 2, 1924.
G. M. GRANT
POSTHOLE DIGGER
Filed June 15, 1922
1,507,057
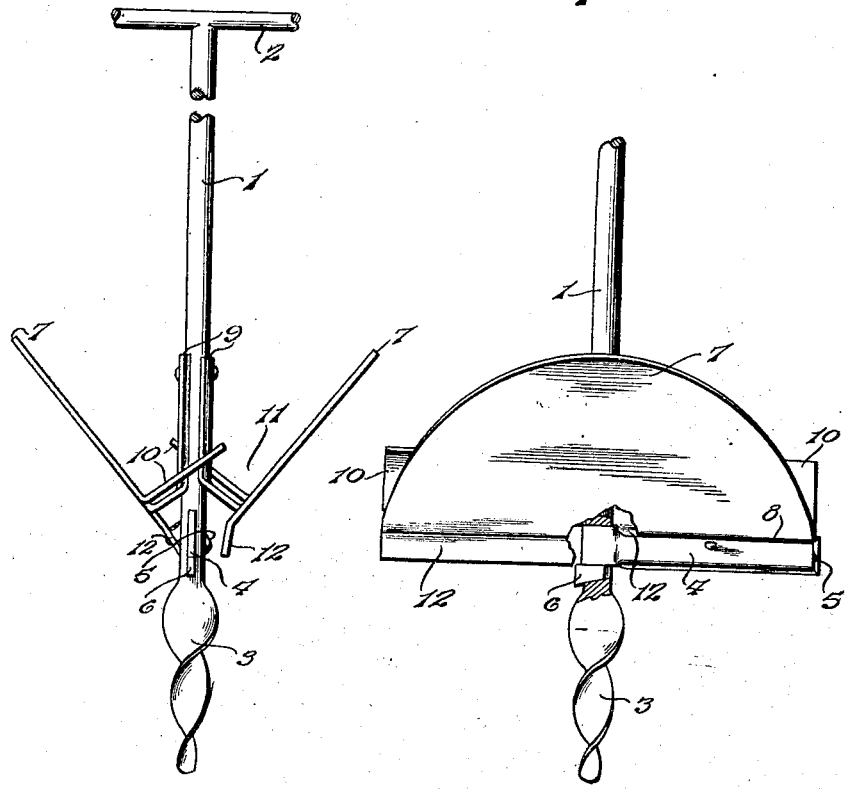
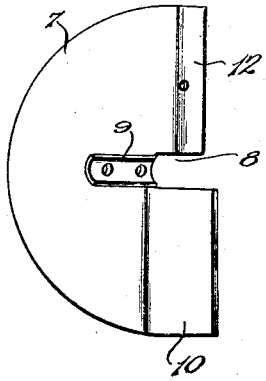
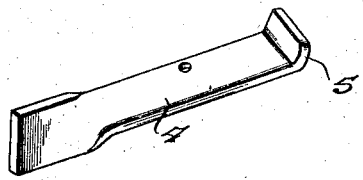
Inventor
G.M. Grant
By
Lacy & Lacy, Attorneys Patented Sept. 2, 1924.

1,507,057

UNITED STATES PATENT OFFICE.

GEORGE M. GRANT, OF OAKLAND, CALIFORNIA.

POSTHOLE DIGGER.

Application filed June 15, 1922. Serial No. 568,635.

*To all whom it may concern:*

Be it known that I, GEORGE M. GRANT, a citizen of the United States, residing at Oakland, in the county of Alameda and State of California, have invented certain new and useful Improvements in Posthole Diggers, of which the following is a specification.

This invention relates to post-hole diggers and has for its object the provision of an inexpensive and easily operated tool whereby an excavation may be very rapidly made and by which the dirt may be easily removed from the formed hole. The invention is illustrated in the accompanying drawings and will be hereinafter fully set forth.

In the drawings—

Figure 1 is an elevation of my improved post-hole digger;

Fig. 2 is an elevation, partly broken away, viewing the device at a right angle to Fig. 1;

Fig. 3 is a detail plan view of one of the wings;

Fig. 4 is a detail of the cutting blade.

In carrying out the invention, I employ a stem or shank 1 which may be of any desired dimensions and is equipped at its upper end with a cross bar or handle 2. At the lower end of the stem, I form or secure a spiral bit 3 which is adapted to enter the ground and bore its way downward therein when the stem is rotated, as will be readily understood. At the upper end of the bit 3, I secure through the stem a cutter blade 4 having a forwardly projecting cutting lip 5 at its outer free end. The inner end or tang of the blade fits within a slot in the stem 1 just above the bit, and between the lower edge of the tang and the lower end of the slot is inserted a wedge 6 to secure the blade firmly in place. Above the cutter, I secure to the stem 1, at diametrically opposite points, the wings or scrapers 7, the lower edges of these wings or scrapers being substantially parallel with the cutter blade 4. Each scraper or wing has its lower edge slitted, as indicated at 8, an attaching tongue 9 being thereby defined. The tongues 9 are shaped to embrace the stem 1, as shown in Figs. 1 and 3, and are secured to the stem by rivets or other suitable devices. Extending upwardly from the edge of each scraper at one side of the stem is a guard plate 10 which acts to prevent back flow over the scraper and the space 11 between the upper surface of one scraper and the guard on the other scraper is sufficient to permit the passage of the dirt which is taken up and all small stones which might otherwise clog the operation of the device. That portion of the edge of the wing or scraper at the opposite side of the stem from the guard 10 is bent downwardly to form a scraping lip 12, and the blade 4 may be riveted or otherwise secured to one of said lips, as shown in Figs. 1 and 2. The wings or scrapers diverge upwardly so that, together, they constitute a support or hopper for the loosened dirt to facilitate its removal from the hole.

In using the device, the bit 3 is caused to penetrate the surface of the ground at the center of the location for the proposed post hole. Rotation of the stem will cause the drill to readily pass downward into the earth notwithstanding that the soil may be of a heavy quality. As the rotation of the stem continues, the blade 4 will eventually be brought against the surface of the ground and its rotation will make an initial cut in the soil defining the area of the post hole. The projecting edge portions of the wings or scrapers will enter the ground immediately following the cutter and will scrape up the top soil so that it will be caused to move upwardly over the inclined surfaces of the wings and will be supported by the same. When the cutter is attached to one wing, the dirt loosened by the cutter will pass over the same directly onto the wing. When the entire surfaces of the wings have been covered, the device may be withdrawn from the hole and the loosened earth will be withdrawn or lifted therefrom by the wings. The upper edges of the wings are arcuate and they fit closely to the wall of the post hole so that the dirt which may be supported upon the wings will not escape therefrom but will be lifted from the hole as the tool is raised.

My device is exceedingly simple and efficient and it will be understood that while I have described it as a post-hole digger, its use is not confined to that field inasmuch as it may be employed for boring wells, the only change needed being the prolongation of the stem and possibly, in some instances, the substitution of mechanical power for manual effort.

Having thus described the invention, what is claimed as new is:

1. A tool for the purposes set forth comprising a stem, a drill carried by the stem, a radially disposed cutter extending from the stem at the upper end of the drill, and reversely arranged inclined wings secured to the opposite sides of the stem above the cutter and each provided with a guard plate adjacent its lower edge and at one side of the stem.

2. A tool for the purposes set forth comprising a stem, a cutter carried by the lower end of the stem, and reversely arranged wings secured to the stem at opposite sides of the same and above the cutter, each of said wings having its lower edge provided with a depending lip at one side of the stem and provided with an upstanding guard plate at the opposite side of the stem.

In testimony whereof I affix my signature.

GEORGE M. GRANT. [L. S.]